United States Patent [19]

Sander et al.

[11] Patent Number: 5,584,777
[45] Date of Patent: Dec. 17, 1996

[54] DIFFERENTIAL CAGE FOR ABSORBING SHOCK MOUNTED IN A DIFFERENTIAL CASING

[75] Inventors: Edmund Sander, Leonberg; Peter Meffert, Tiefenbronn; Peter Hoebel, Neuhausen-Schellbronn, all of Germany

[73] Assignee: Dr. Ing. h.c.F. Porsche AG, Weissach, Germany

[21] Appl. No.: 444,101

[22] Filed: May 18, 1995

[30] Foreign Application Priority Data

May 18, 1994 [DE] Germany .......................... 44 17 373.3

[51] Int. Cl.$^6$ .......................... F16H 1/40; F16H 57/08; B60K 17/16
[52] U.S. Cl. .......................... 475/230; 475/346; 74/606 R
[58] Field of Search .......................... 74/606 R; 475/221, 475/230, 242, 346

[56] References Cited

U.S. PATENT DOCUMENTS

| 2,364,411 | 12/1944 | White ........................................ 475/230 |
| 3,057,226 | 10/1962 | Blomberg ................................... 475/230 |
| 3,651,713 | 3/1972 | Mueller ..................................... 475/230 |
| 4,037,492 | 7/1977 | Ashauer et al. ......................... 475/230 X |
| 4,221,138 | 9/1980 | Stewart et al. ............................. 74/607 |
| 4,455,889 | 6/1984 | Hause ....................................... 475/230 |
| 4,513,635 | 4/1985 | Takimura et al. ........................ 475/230 |
| 5,480,360 | 1/1996 | Patzer et al. .............................. 475/230 |

FOREIGN PATENT DOCUMENTS

| 2438773 | 5/1980 | France . |
| 2547007 | 12/1984 | France ....................................... 74/606 R |
| 1810520 | 6/1970 | Germany . |
| 4115304 | 11/1992 | Germany . |
| 4313322 | 10/1994 | Germany . |
| 58-137643 | 8/1983 | Japan ......................................... 475/230 |
| 4-296246 | 10/1992 | Japan ....................................... 74/606 R |

Primary Examiner—Khoi Q. Ta
Attorney, Agent, or Firm—Evenson, McKeown, Edwards & Lenahan, P.L.L.C.

[57] ABSTRACT

A differential for the axle drive of a motor vehicle has a cage in the interior of which the axle shaft gears are guided and on which they are supported. For absorbing the forces acting in the direction of the axle drive shafts, the cage is made of a tube section and has at least two diametrical bores for the receiving and leadthrough of the axle drive shafts. As a result, the differential can be manufactured with a reduced weight and lower cost while having a high stiffness.

10 Claims, 5 Drawing Sheets

DIFFERENTIAL CAGE FOR ABSORBING SHOCK MOUNTED IN A DIFFERENTIAL CASING

BACKGROUND AND SUMMARY OF THE INVENTION

This invention relates to a differential for a motor vehicle, and more particularly, to a differential for the axle drive of a motor vehicle, including a differential case carrying a driving wheel. An axle bolt is disposed in the differential case which carries differential gears. These differential gears mesh with axle shaft gears arranged on axle drive shafts. These axle shaft gears are constructed as bevel gears, and are disposed in a cage, absorbing forces acting in the direction of the axle drive shafts.

German Patent document P 43 13 322.3 illustrates and describes a differential for the axle drive of a motor vehicle in the case of which the axle shaft gears are disposed in a cage. This cage absorbs the forces acting in the direction of the axle drive shafts. This frees the differential case from these forces. The differential case can, therefore, have smaller dimensions. This separate cage permits the insertion of the axle shaft gears and the axle bolt before the whole differential is mounted.

It is an object of the present invention to further develop such a differential so that the cage is optimized with respect to its stiffness, has a light weight, is low in cost and is easy to manufacture and mount. According to the present invention, this object is achieved by a differential for the axle drive of a motor vehicle, including a differential case carrying a driving wheel. An axle bolt is disposed in the differential case which carries differential gears. These differential gears mesh with axle shaft gears arranged on axle drive shafts. These axle shaft gears are constructed as bevel gears, and are disposed in a cage, absorbing forces acting in the direction of the axle drive shafts. The cage is made of a tube section whose wall has at least two diametrical bores through which the axle drive shafts are lead.

If, in the case of a differential of the above-mentioned type, the cage consists of a tube section whose wall has at least two diametrical bores for the lead through of the axle drive shafts, particularly during series production, this tube section can be manufactured by dividing a prefabricated or commercially available tube, without any high losses of material. Because of the favorable course of the tension, the wall thickness of such a tube section may be kept relatively narrow so that the corresponding cage is relatively light. In an additional or parallel operating step, at least two diametrical bores through which the axle drive shafts are led are provided in this tube section. A joining or connecting of the cage, as in the case of the cage according to the German Patent document P 43 13 322.3, is not required so that, on the one hand, an additional manufacturing step is saved and, on the other hand, a connecting point having an altered stability is avoided.

In an advantageous embodiment, the differential or its cage can be improved if the cage consists of a cylindrical tube section which is changed to a spherical shape through a deformation operation. This deformation operation is preferably carried out in a non-cutting manner via expanding or rolling round. This deforming operation improves the course of tension in the cage. This is because tension peaks are avoided by eliminating small curvature and corner radii. At the same time, the bearing of the axle shaft gears is improved, since these gears can be supported in the shape of a spherical segment on the cage. As a result of this improvement of the shape and of the course of the tension, the wall thickness of the cage can again be reduced so that its weight can be further reduced.

Particularly for average driving power situations, and correspondingly low driving and reaction forces in the differential, the weight of the case can be again reduced if two additional diametrical bores are provided which extend approximately at a right angle to those of the axle drive shaft and by which the axle bolt is guided.

For high driving power situations and correspondingly high reaction forces in the differential, this differential or the cage can be improved in an advantageous further embodiment by providing the cage with a rectangular cross-section having rounded corners and a stress-specifically adapted wall thickness. As a result of the stress-specific and tension-optimized wall thicknesses of the cage, this cage can be optimized with respect to its weight as well as its stability. The stress-specifically adapted wall thickness and the rounding of the corners result in optimal stabilities and an optimal course of tension while avoiding tension peaks. This type of a rectangular profile or square tube profile can be produced in a simple and advantageous manner from an extruded profile.

A cage of this type having a rectangular or square cross-section may be further improved by curving the walls with the bores for guiding the axle drive shafts toward the inside in the installed condition. As a result, an improved defined supporting behavior and a spring effect are obtained for minimizing the load peaks. Furthermore, for low loads and correspondingly low reaction forces or supporting forces, because of this curvature toward the inside, a lubricating gap construction is achieved through which lubricant can reach the bevel gear guide area.

The mounting and the assembly of the differential are facilitated when the axle bolt is surrounded by a guide ring which is arranged between the differential bevel gear and a stop surface. The guide ring has guide extensions which are supported on the cage and guide the cage and the axle bolt relative to one another. By using this guide ring, on the one hand, a sliding surface is created between the stop surface on the axle bolt and the supported bevel gear and, on the other hand, because of the positionally correct assignment of the axle bolt and the cage, sliding movement of the cage is prevented so that no additional positioning expenditures are required during the assembly.

The assembly of the differential is further facilitated if one centering sleeve, respectively, is supported on the case. The centering sleeve projects through the cage and centers it and the differential bevel gear in the correct position. On the one hand, this prevents the cage from turning and, on the other hand, an intermediate constructional unit can be created which, after the installation into the case, is arranged in the correct position and is torsionally secured and therefore facilitates the installation of the axle shafts.

By using a sliding cup arrangement between the cage and the axle shaft gears, the gear's running behavior can be improved by a friction reduction. At the same time, an improved plane support of the axle shaft gears is obtained on the cage.

Other objects, advantages and novel features of the present invention will become apparent from the following detailed description of the invention when considered in conjunction with the accompanying drawings.

DETAILED DESCRIPTION OF THE DRAWINGS

Figure 1:
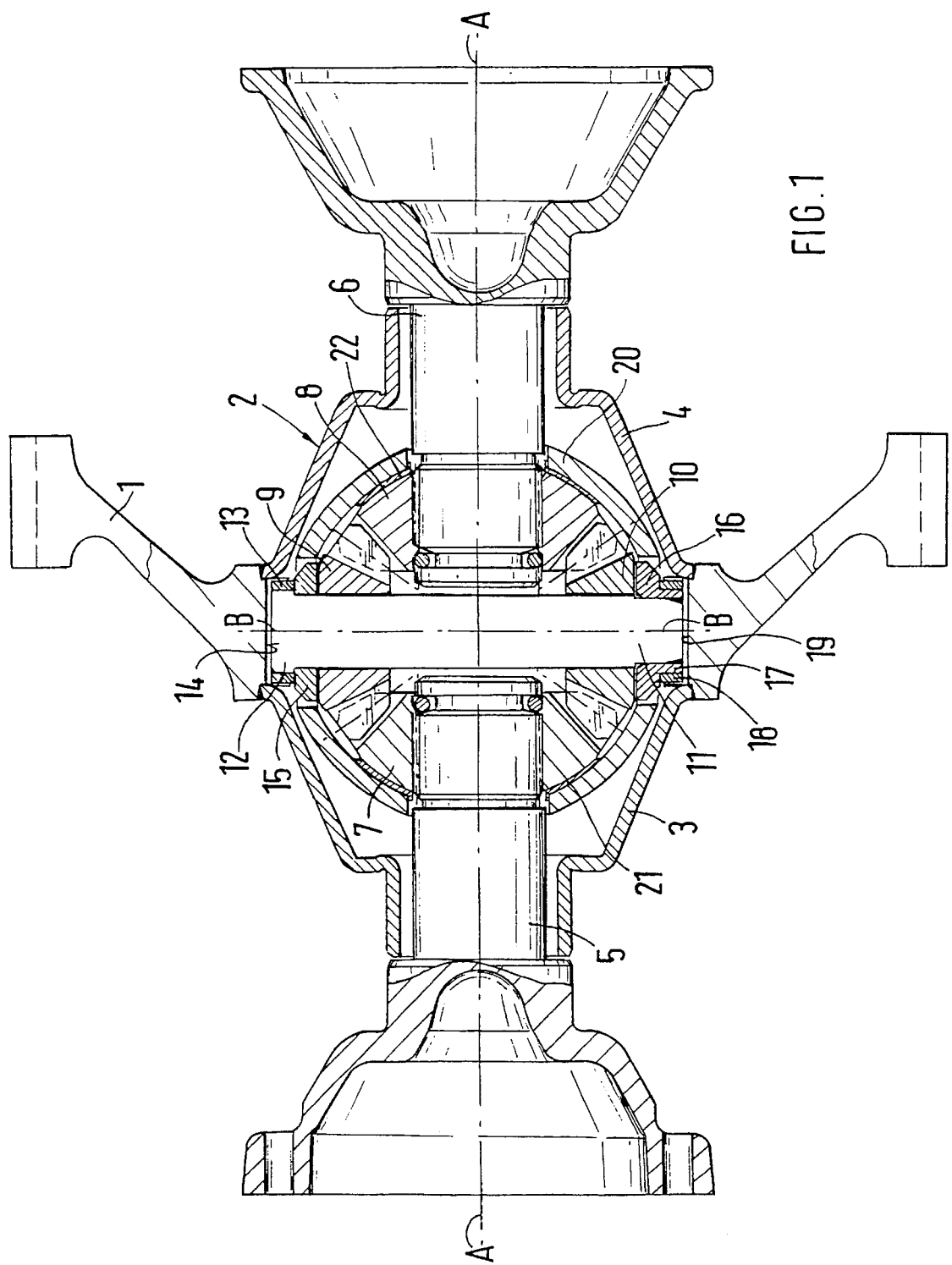
FIG. 1 is a sectional view of a differential according to the invention.

Referring to FIG. 1, a differential for the axle drive of a motor vehicle includes a driving wheel 1 which is fixedly connected with a differential case 2. The differential case 2 consists of two parts 3 and 4, having a pot-like shape, which have a rotationally symmetrical construction with respect to an axis A—A and may be identical. The free end sections of two mutually opposite axle drive shafts 5, 6, having their longitudinal axes situated on the axis of rotation A—A, project into the differential case 2. On the free ends of the axle drive shafts 5, 6 arranged inside the differential case, an axle shaft gear 7, 8 is, in each case, disposed in a non-rotatable but axially slidable manner. These axle shaft gears 7, 8 are constructed as bevel gears and mesh with two opposite differential gears 9, 10 which are also constructed as bevel gears. These differential gears 9, 10 are disposed on an axle bolt 11 having a longitudinal axis B—B extending approximately perpendicular with respect to the axis of rotation A—A. On its top side, the axle bolt 11 has a flange 12 with a larger diameter. The flange 12 is surrounded by a guide element 13 which is guided with some play in a recess 14 formed between the two parts 3 and 4 and the driving wheel 1. A supporting ring 15 rests against the flange 12 of the axle bolt 11. The differential gear 9 is supported on this supporting ring 15. The opposite differential gear 10 rests against a second supporting ring 16 which is welded to the free end of the axle bolt 11. On a collar-type extension 17, this supporting ring 16 is surrounded by a guide element 18 which is guided with some play in a recess 19 between the two parts 3, 4 of the differential case 2 and the driving wheel 1. The recesses 14, 19 and the guide element 13, 18 are, in each case, designed such that the axle bolt 11 can be slid slightly in the direction of the axis of rotation A—A and the longitudinal axis B—B.

The axle shaft gears 7, 8 and parts of the differential gears 9,10 are surrounded by a cage 20, as illustrated, for example, in FIGS. 3a to 3d. Because of the forces in the direction of the axis of rotation A—A occurring during the operation of the differential, the axle shaft gears 7, 8 are supported on the case 20. For better contact and for reducing friction, one sliding cup 21, 22 is, respectively, fastened on the cage 20 arranged between the axle shaft gears 7, 8 and the cage 20.

The cage 20 shown in detail in FIGS. 3a to 3d includes a tube-like section whose longitudinal axis, in this embodiment, is situated on an axis C—C which is perpendicular to the axis of rotation A—A and the longitudinal axis B—B of the axle bolt. By means of a non-cutting deformation, for example, by rolling round or expanding, the shell surface of the tube section is formed into a spherical shape. The cage 20 is penetrated by four bores 23 to 26, of which bores 23, 24 and 25, 26 are in each case situated opposite one another in pairs. In this case, the two bores 23, 24 are situated on the axis of rotation A—A. The free ends of the axle drive shafts 5, 6 pass through the bores 23, 24. The bores 25, 26, which are arranged at a right angle thereto, are each situated on the longitudinal axis B—B and are used for accommodating or inserting of the axle bolt 11.

Figure 2:
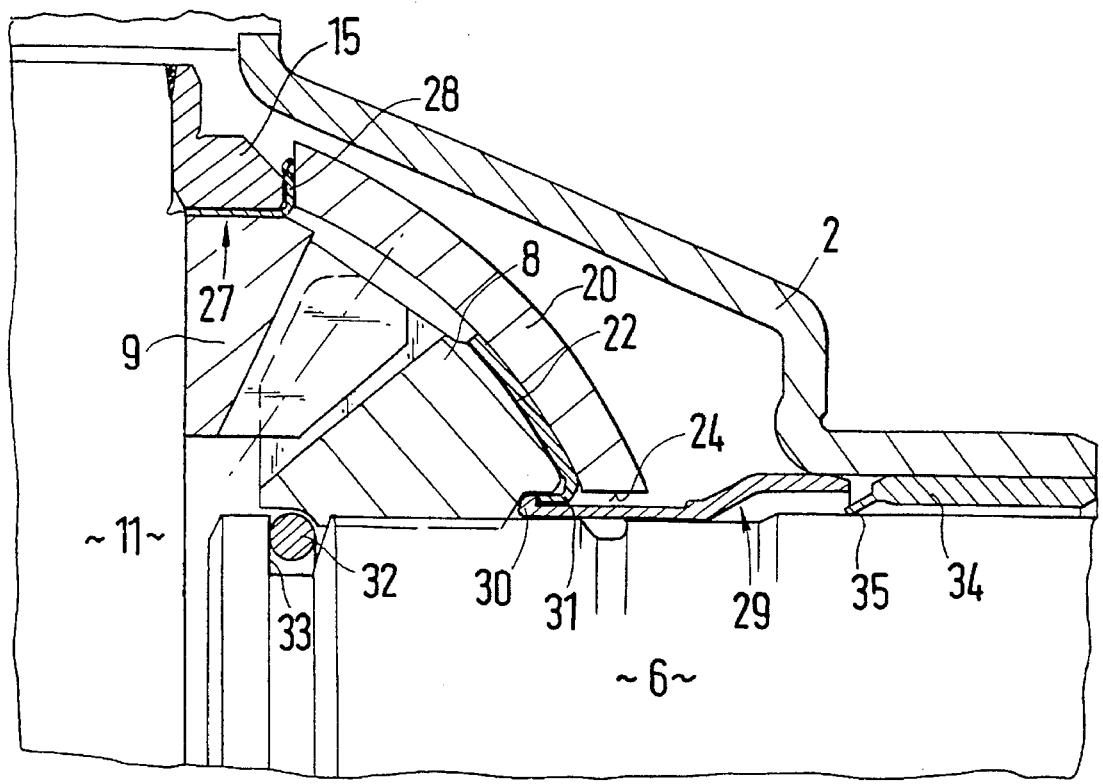
FIG. 2 is a partially shown sectional view of a modified form of the differential according to the invention.
Figure 3A:
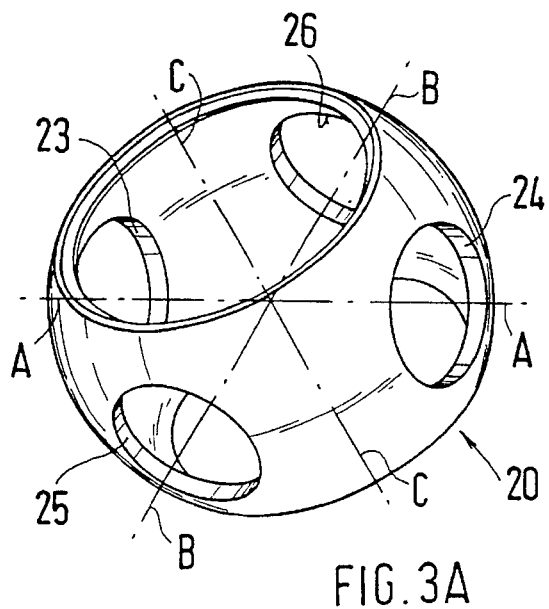
FIGS. 3a–d are views of a first embodiment of a cage.
Figure 3B:
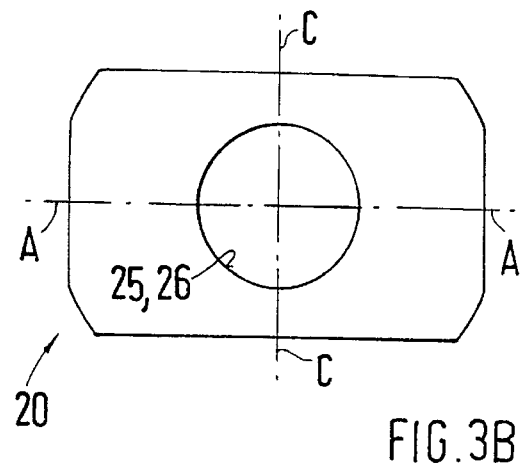
Figure 3C:
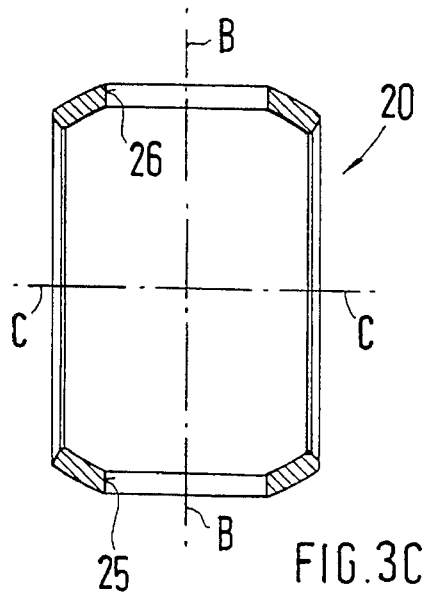
Figure 3D:
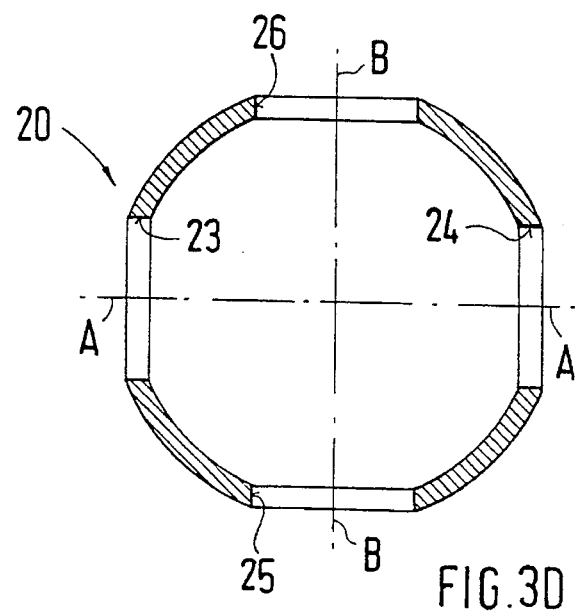

In a modification of the differential, illustrated in FIG. 2, a guide ring 27 is arranged between the differential gears (only differential gear 9 is shown here), and the assigned supporting rings 15, 16. The ring surface of the guide ring 27 is used as the running surface between the differential gear 9 and the supporting ring 15. This guide ring 27 extends around the axle bolt 11 and rests against it. Several bent spring arms 28 project from its outer circumference and, on the one side, rest against the wall of the bore 25, 26 of the cage 20 and, on the other side, rest against the supporting ring 15, 16. This guide ring 27 may be made, for example, of plastic and, on the one hand, is used as a running surface between the differential gear and the supporting ring and, on the other hand, as the guiding or centering element by which the axle bolt 11 and the cage 20, during the mounting, are brought into and held in the correct positional alignment.

A centering sleeve 29 projects through the bores 23, 24 and in each case extends around the axle drive shaft 5, 6 and, in the area of the shaft leadthrough, rests against the differential case 2. This centering sleeve 29 projects into the interior of the cage 20 and reaches, by means of detents 30, behind a cylindrical extension 31 of the sliding cup 21, 22. With this centering sleeve 29, an assembly unit comprising the cage, the differential gears and the axle shaft gears, together with the axle bolts, can be centered in the correct position in the differential case 2, before the axle drive shafts 5, 6 are mounted. The axle drive shafts 5, 6 can then, without any further adjusting or positioning operations, be slid into the differential case 2, the corresponding bore in the cage 20 and the respective differential gear. Using a securing ring 32, which is arranged in a groove 33 of the axle drive shaft 5, 6, the respective axle drive shaft is secured with respect to an unintentional loosening.

In order to provide the differential case 2 with a separate lubricant filling, the axle drive shafts 5, 6 are each surrounded with a narrow amount of play by one bearing bush 34, respectively. These are each arranged in the differential case 2 and have sealing lips 35 which rest against the axle drive shaft 5, 6. This provides an interior space in the differential case 2 which is sealed off with respect to the environment.

Figure 4A:
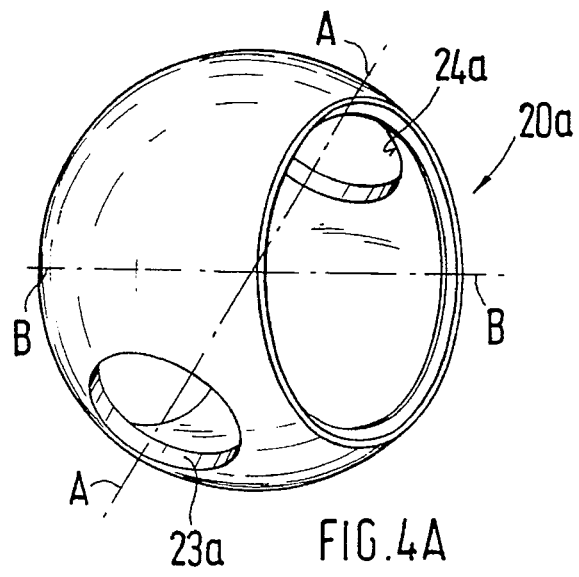
FIGS. 4a–d are views of a second embodiment of the cage.
Figure 4B:
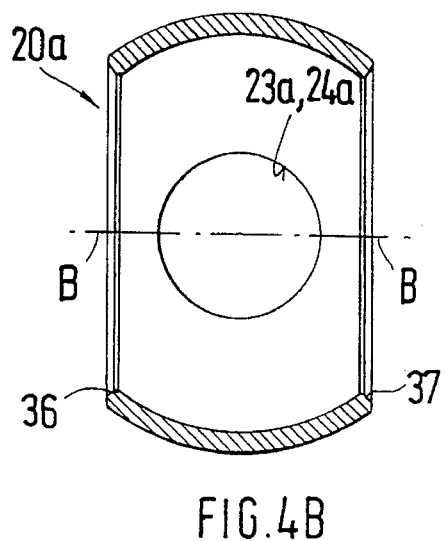
Figure 4C:
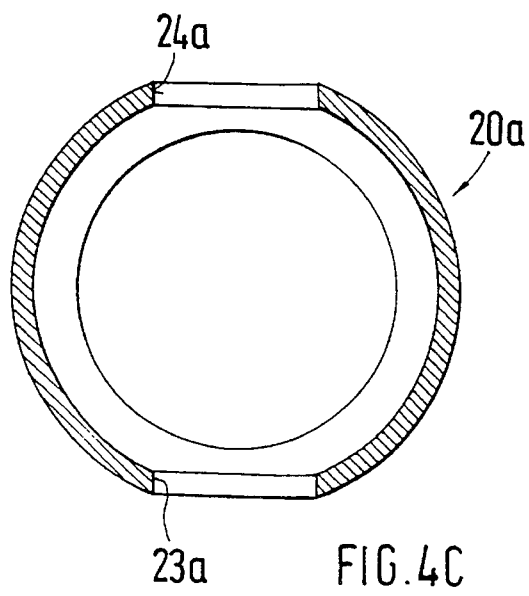
Figure 4D:
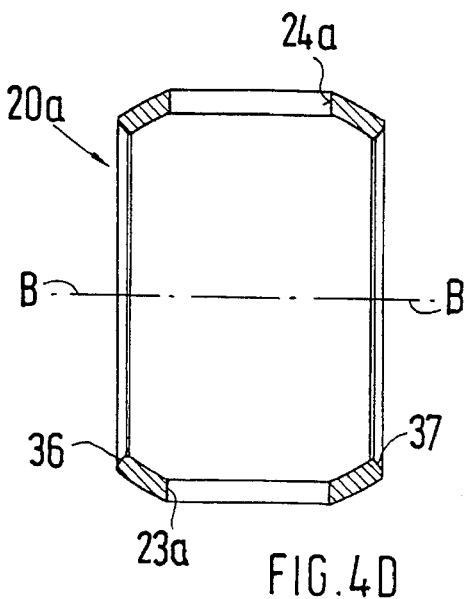
Figure 5A:
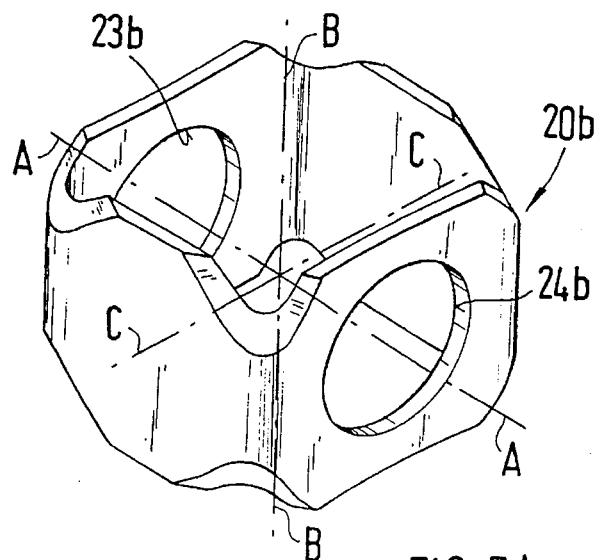
FIGS. 5a–d are views of a third variant of the cage.
Figure 5B:
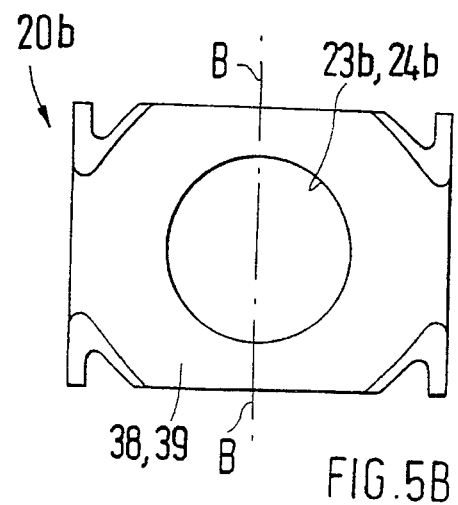
Figure 5C:
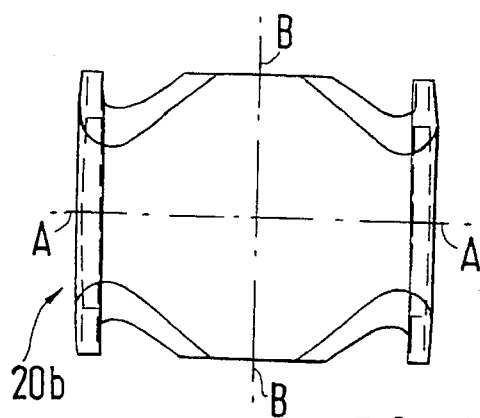
Figure 5D:
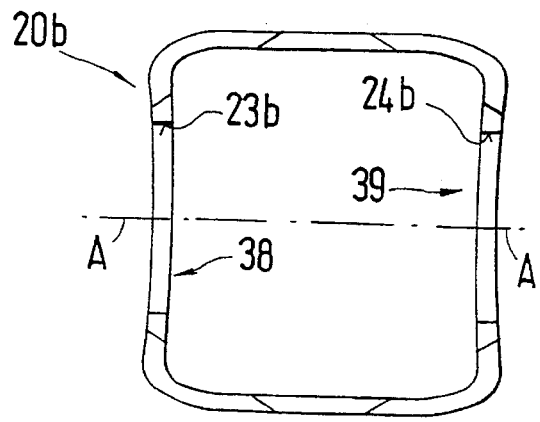

In order to be able to support higher driving powers or loads while maintaining the outer dimensions and wall thicknesses of the cage 20 relatively the same, the cage may be modified, as illustrated in FIGS. 4a to 4b. The cage 20a illustrated in FIGS. 4a to 4d also consists of a cylindrical tube section whose shell surface is spherically expanded or rolled round. In contrast to the previous embodiment, the longitudinal axis of the cage 20a corresponds to the longitudinal axis B—B. Two diametrical bores 23a, 24a are provided in the shell surface of the cage 20a. The bores 23a, 24a are each disposed on the axis of rotation A—A and are used for receiving or leading through the axle drive shafts 5, 6. The installation of the cage into the differential case 2 takes place such that, with respect to the cage illustrated above, this cage 20a is installed in a manner that is rotated by 90° so that the axle bolt 11 projects through the tube openings 36, 37. By means of this construction and arrangement of the cage 20a, the shell surface is penetrated only by two diametrical bores and is therefore weakened less. It is therefore possible to receive a higher load while maintaining the outside dimensions and wall thickness the same. In order to protect against torsion according to FIG. 2 in the case of cage 20a, the guide ring 27 is modified such that at least some of the guiding arms 28 are constructed to be longer and are bent such that they rest on or in the tube opening 36, 37 and, therefore, guide and center the cage 20 in the correct position.

With respect to the two above-described cages, the cage 20b illustrated in FIGS. 5a to 5d differs mainly by the changed tube profile or the changed tube cross-section. The cage 20*b* consists of a tube section having an almost square cross-section. A tube section of this type, or a profile tube of this type, may be constructed and manufactured, for example, as an extruded profile. In order to avoid tension peaks during the operation, the corners of the tube profile are rounded. In order to permit a small overall size for the differential case 2, the edges or corners may be broken or bevelled. The wall thicknesses of the tube are not uniform but, in an adaptation to the load occurring during the operation, are constructed to be continuously decreasing or increasing. Like cage 20*a*, cage 20*b* is penetrated by two diametrical bores 23*b*, 24*b*. These two bores are used for the receiving or leading through of the axle drive shafts 5, 6. The lead-through and the receiving of the axle bolt 11 takes place as in the case of cage 20*a* through the tube openings 36, 37. The arrangement of cage 20*b* in the differential case 2 takes place analogously to the above-described embodiment. The two opposite walls 38, 39 with the bores 23*b* and 24*b* are curved to the inside. By curving the wall to the inside, a certain springing effect is created during the operation, the supporting or running behavior of the axle drive gears is improved and, at the same time, a surrounding lubricating wedge is formed while the supporting forces to be absorbed by the cage are low.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A differential for an axle drive of a motor vehicle having a differential case carrying a driving wheel, an axle bolt disposed in the differential case carrying differential gears, axle drive shafts having shaft gears constructed as bevel gears which mesh with the differential gears, wherein the differential further comprises a cage arranged in the differential case to absorb forces acting in a direction of the axle drive shafts, said bevel gears and said differential gears being mounted in said cage, wherein said cage is formed of a tube section having a wall with at least two diametrically opposed bores, each of said axle drive shafts extending through a respective one of said two bores.

2. Differential according to claim 1, wherein said cage has a spherical shape.

3. Differential according to claim 1, wherein said cage includes two additional diametrically opposed bores for receiving the axle bolt.

4. Differential according to claim 1, wherein said cage comprises a tube section having a rectangular profile and rounded corners, as well as stress-specifically adapted wall thicknesses.

5. Differential according to claim 4, wherein walls of the cage having the at least two bores for receiving the axle drive shafts are curved toward the inside of the cage in an installed condition.

6. Differential according to claim 1, further comprising one guide ring surrounding the axle bolt, said one guide ring being arranged between the differential gear and a supporting surface and having guiding arms which are applied to said cage, said guiding arms guiding the gage and the axle bolt relative to one another.

7. Differential according to claim 1, further comprising a sliding cup arranged in an interior of the cage on which the differential gear is supported in a sliding manner.

8. Differential according to claim 1, further comprising one centering sleeve supported in the differential case, said one centering sleeve projecting through said cage and centering said cage and the axle shaft gear in the correct position.

9. Differential according to claim 8, wherein the one centering sleeve further includes detent devices for hooking said one centering sleeve in the interior of said cage.

10. A differential for an axle drive of a motor vehicle, comprising:

a differential case carrying a driving wheel;

an axle bolt disposed in the differential case, said axle bolt carrying differential gears;

axle drive shafts carrying axle shaft gears which mesh with the differential gears, the axle shaft gears being constructed as bevel gears;

a cage in which said bevel gears and said differential gears are mounted, said cage being formed of a tube section having a wall with at least two diametrically opposed bores, each of said axle drive shafts extending through a respective one of said two bores; and wherein said cage is arranged in the differential case and absorbs forces acting in a longitudinal direction of the axle drive shafts.

\* \* \* \* \*